Sept. 9, 1947.　　　　　T. K. COX　　　　　2,427,197
BONDING OF RUBBER AND RUBBERLIKE COMPOSITIONS
Filed Aug. 18, 1942
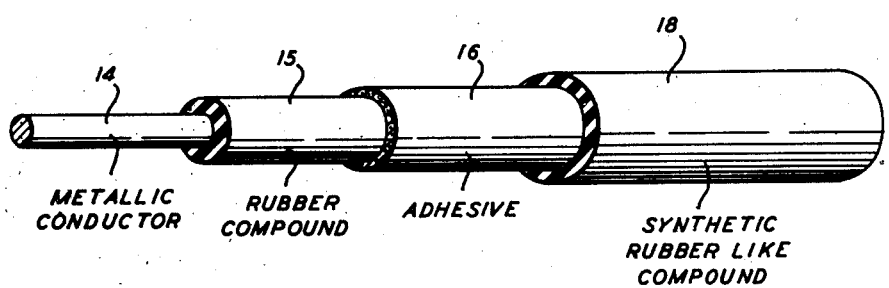
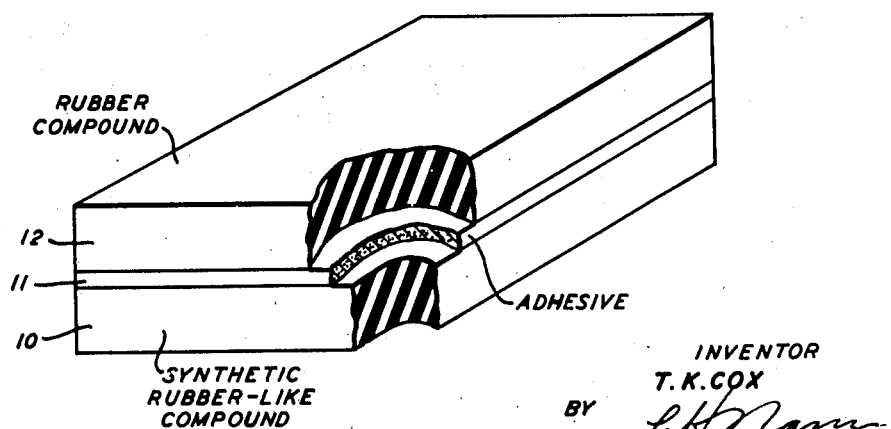
INVENTOR
T. K. COX
BY
ATTORNEY Patented Sept. 9, 1947

2,427,197

UNITED STATES PATENT OFFICE 2,427,197

BONDING OF RUBBER AND RUBBERLIKE COMPOSITIONS

Thomas K. Cox, Randallstown, Md., assignor to Western Electric Company, Incorporated, New York, N. Y., a corporation of New York Application August 18, 1942, Serial No. 455,204

16 Claims. (Cl. 174—120)

This invention relates to the production of composite articles and more particularly to the art of uniting rubber composition surfaces and synthetic rubber-like composition surfaces to produce composite articles.

Rubber compositions and synthetic rubber-like compositions each have desirable qualities not present in the other, so that for a number of purposes a combination of layers of the two compositions is used to obtain the highest quality product. For example, in the production of insulated metallic conductors, certain rubber compositions have proved to be very good electrical insulators and are quite elastic and durable, but are quickly deteriorated by oil or grease and to a lesser extent by sunlight. Synthetic rubber-like compositions have only fair electrical insulating characteristics and are not very durable physically, but, on the other hand, they are relatively unaffected by oil, grease or sunlight. Thus, a conductor insulated with a combination of layers composed of these two classes of compounds represents a product in which the desired qualities of each compound are combined to produce a high quality product. However, heretofore no satisfactory method of obtaining a tight bond between two such layers during the vulcanization process had been perfected.

Objects of this invention are to provide new and useful composite articles and to provide new and effective methods of and adhesives for uniting surfaces to produce composite articles.

Other features and advantages of the invention will become apparent from the following detailed description, when read in conjunction with the accompanying drawings, in which Fig. 1 is a perspective view of a composite article embodying the invention, and Fig. 2 is a perspective view of an insulated conductor embodying the invention.

In the particular embodiment of the invention disclosed in Fig. 1, a layer 10 of a rubber compound is coated with a film 11 of an ester. The thickness of the film 11 as shown in Fig. 1 is necessarily exaggerated, since in actual practice this ester film is almost imperceptible to the naked eye. A layer 12 of a synthetic rubber-like compound is pressed against the ester film 11, and the thus-formed composite article is subjected to heat and pressure to unite the layers 10 and 12 to one another.

The ester film 11 may be composed of any one of a large variety of esters. Dibutyl phthalate, tricresyl phosphate, ethyl acetoacetate, ethyl acetate, butyl acetate, methyl benzoate, methyl salicylate, triethylene-glycol-di-2-ethyl butyrate, and triethylene-glycol-di-2-ethyl hexoate are some of the esters which are suitable for the purpose of this invention. Tricresyl phosphate may be considered to be an aryl ester of an inorganic acid; dibutyl phthalate, methyl benzoate and methyl salicylate are esters of aromatic acids; ethyl acetoacetate is an inner ester of a tautomeric acid; butyl acetate and ethyl acetate are esters of aliphatic acids of low molecular weight; and triethylene-glycol-di-2-ethyl butyrate and triethylene-glycol-di-2-ethyl hexoate are high molecular weight esters of aliphatic acids. The layer 11 may consist entirely of one or more of the above esters or may comprise an ester and suitable solvent or diluent thereof. Mixtures of the above esters either with or without the addition of solvents or diluents likewise may be used. Any ester which wets both of the surfaces of layers 10 and 12 and which is compatible therewith may be employed as a bonding agent.

The layer 10 may be composed of various rubber compounds, and the layer 12 may be composed of various synthetic rubber-like compounds. One synthetic rubber-like compound that has been found suitable contains as the vulcanizable ingredient polymerized chloroprene, which is sold under the trade name "neoprene" by E. I. du Pont de Nemours & Company. Other similar synthetic rubber-like compositions may also be used with satisfactory results. The layers 10 and 12 will be bonded to one another by the above described process whether or not either or both of said layers are vulcanized or unvulcanized before the composite article is subjected to heat and pressure.

To illustrate the invention further, another specific application thereof is disclosed in Fig. 2, in which a metallic conductor 14 is covered with a layer of a rubber compound 15. The layer 15 may be either vulcanized or unvulcanized, but in this particular embodiment of the invention it is applied to the conductor in the unvulcanized state and later vulcanized in situ. A film 16 of an ester of the type above described, and which in this embodiment is dibutyl phthalate, is then applied in any suitable manner over the vulcanized rubber compound layer 15. An outer layer 18 of a synthetic rubber-like compound is placed over the film 16. In this particular embodiment of the invention the layer 18 is a suitable compound containing "neoprene" as the principal vulcanizable substance. This outer layer 18 of synthetic rubber-like compound may be applied in either the vulcanized or unvulcanized state, but in this embodiment of the invention it is placed over the ester film 10 in the unvulcanized state and later vulcanized when the insulated conductor is subjected to heat and pressure.

This invention also may be utilized to bond two layers of like or unlike synthetic rubber-like compounds. For example, it may be desirable to bond one composition containing "neoprene" as the vulcanizable ingredient to another composition containing "neoprene." Esters of the type referred to hereinabove may be used in the manner described to cause the surfaces of such compositions to adhere or bond to one another.

"Neoprene" is not actually vulcanized by heat and pressure in the same sense that rubber compounds are vulcanized, but the reaction in such synthetic rubber-like compounds which does take place due to the heat and the pressure is intended to be included in the definition of the term "vulcanizing," as that term is used in this application. It is also to be noted that while unvulcanized rubber compositions and unvulcanized rubber-like compositions will generally adhere to one another when vulcanized in contact with one another, the use of an ester film between the two compositions aids materially in bonding them to one another.

What is claimed is:

1. The method of bonding surfaces of vulcanizable compounds, one of which compounds contains polymerized chloroprene as the vulcanizable ingredient and the other of which contains material of the group consisting of rubber and polymerized chloroprene as the vulcanizable ingredient, at least one of which compounds is unvulcanized, which comprises applying to one of such surfaces a layer whose sole active ingredient is a compound of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, placing the other surface in contact with said layer, and vulcanizing the unvulcanized material under heat and pressure.

2. The method of obtaining adhesion between a rubber composition surface and a synthetic rubber-like composition surface containing polymerized chloroprene as the vulcanizable constituent, which comprises coating one of such surfaces with a layer whose sole active ingredient is a compound of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, placing the other of said surfaces in contact with the said layer, and subjecting the layers to heat and pressure to bond the surfaces to one another.

3. The method of uniting surfaces, which comprises applying a thin film consisting of dibutyl phthalate to a vulcanized rubber composition surface, placing in contact with the dibutyl phthalate film an unvulcanized synthetic rubber-like composition surface containing polymerized chloroprene as the vulcanizable constituent, and vulcanizing the unvulcanized synthetic rubber-like composition surface.

4. The method of uniting surfaces, which comprises applying a thin film consisting of tricresyl phosphate to a vulcanized rubber composition surface, placing in contact with the tricresyl phosphate film an unvulcanized synthetic rubber-like composition surface containing polymerized chloroprene as the vulcanizable constituent, and vulcanizing the unvulcanized synthetic rubber-like composition surface.

5. The method of uniting surfaces, which comprises applying a thin film consisting of ethyl acetate to a vulcanized rubber composition surface, placing in contact with the ethyl acetate film an unvulcanized synthetic rubber-like composition surface containing polymerized chloroprene as the vulcanizable constituent, and vulcanizing the unvulcanized synthetic rubber-like composition.

6. The method of uniting an unvulcanized rubber composition surface and an unvulcanized synthetic rubber-like composition surface containing polymerized chloroprene as the vulcanizable constituent, which comprises applying to one of such surfaces a thin film whose sole active ingredient is an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, placing the other surface in contact with the ester film, and vulcanizing both of said surfaces.

7. The method of uniting a rubber composition surface and a synthetic rubber-like composition surface in which polymerized chloroprene is the rubber-like constituent, at least one of which surfaces is unvulcanized, which comprises applying to one of such surfaces a thin coating of an ester which has the property of wetting both of said surfaces and which is compatible therewith, said ester being one of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, placing the other surface in contact with the ester coating, and vulcanizing the unvulcanized surface.

8. The method of covering an article, which comprises applying a layer of a vulcanized rubber composition upon an article, coating the vulcanized rubber composition layer with a thin film whose sole active ingredient is an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate and triethylene-glycol-di-2-ethyl hexoate, applying a layer of unvulcanized synthetic rubber-like composition surface containing polymerized chloroprene as the vulcanizable constituent over the ester film, and vulcanizing the latter layer in situ.

9. The method of insulating a metallic conductor, which comprises covering a metallic conductor with a layer of a rubber composition, vulcanizing the layer in situ, applying to the vulcanized rubber layer a thin film whose sole active ingredient is an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, applying a layer of synthetic rubber-like composition containing polymerized chloroprene as the vulcanizable constituent over the ester film, and vulcanizing the synthetic rubber-like composition layer in situ.

10. An insulated conductor, which comprises a metallic conductor, a layer of a vulcanized rubber composition adjacent to the metallic core, a layer of vulcanized synthetic rubber-like composition containing polymerized chloroprene as the vulcanizable constituent surrounding the rubber composition layer, and a film consisting of an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, said ester film having been applied between said layers prior to the vulcanization of one of said layers in order to bond the two layers to one another.

11. The method of uniting surfaces of vulcanizable compounds containing polymerized chloroprene as their vulcanizable ingredient, at least one of which compounds is unvulcanized, which comprises applying to one of such surfaces a film whose sole active ingredient is a compound of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, placing the other surface in contact with said film, and vulcanizing the unvulcanized compound under heat and pressure.

12. A composite article, which comprises a layer of a vulcanized synthetic rubber-like composition containing polymerized chloroprene as the vulcanizable constituent, a film consisting solely of an ester covering the rubber-like layer, which ester is selected from the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, and a second layer of a vulcanized composition containing as the vulcanizable constituent a member of the group consisting of rubber and polymerized chloroprene in contact with the ester film, said ester film having been applied between said layers prior to the vulcanization of one of said layers in order to bond the two layers to one another.

13. A composite article, which comprises a plurality of layers of vulcanized synthetic rubber-like compositions containing polymerized chloroprene as the vulcanizable constituent separated by a film consisting of an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, said ester film having been applied between said layers prior to the vulcanization of one of the layers in order to bond the layers to one another.

14. The method of making insulated conductors, which comprises covering a metallic conductor with a layer of a rubber composition, vulcanizing the rubber composition layer, coating the vulcanized layer with a thin film consisting of tricresyl phosphate, applying a layer of polymerized chloroprene composition over the film, and vulcanizing the latter layer, whereby the rubber and polymerized chloroprene composition layers are bonded to one another.

15. The method of making insulated conductors, which comprises covering a metallic conductor with a layer of a rubber composition, vulcanizing the rubber composition layer, coating the vulcanized layer with a thin film consisting of dibutyl phthalate, applying a layer of polymerized chloroprene composition over the film, and vulcanizing the latter layer, whereby the rubber and polymerized chloroprene composition layers are bonded to one another.

16. The method of making insulated conductors, which comprises covering a metallic conductor with a layer of a rubber composition, vulcanizing the rubber composition layer, coating the vulcanized layer with a thin film consisting of ethyl acetate, applying a layer of polymerized chloroprene composition over the film, and vulcanizing the latter layer, whereby the rubber and polymerized chloroprene composition layers are bonded to one another.

THOMAS K. COX.

REFERENCES CITED

The following references are of record in the file of this patent:

UNITED STATES PATENTS

| Number | Name | Date |
| --- | --- | --- |
| 2,093,501 | Williams | Sept. 21, 1937 |
| 2,147,620 | Winkelmann | Feb. 14, 1939 |
| 2,226,541 | Browne | Dec. 31, 1940 |

FOREIGN PATENTS

| Number | Country | Date |
| --- | --- | --- |
| 499,908 | Great Britain | Jan. 31, 1939 |

OTHER REFERENCES

Transactions, Institution of the Rubber Industry, Aug. 1937, vol. 13, page 150.

The India Rubber Journal, pages 784–786, May 31, 1930.